Patented Sept. 4, 1934

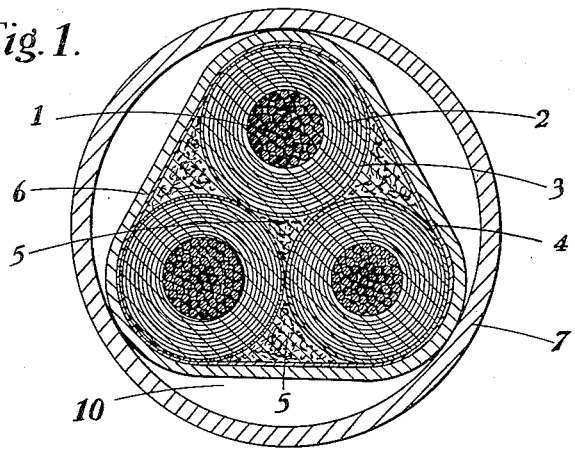
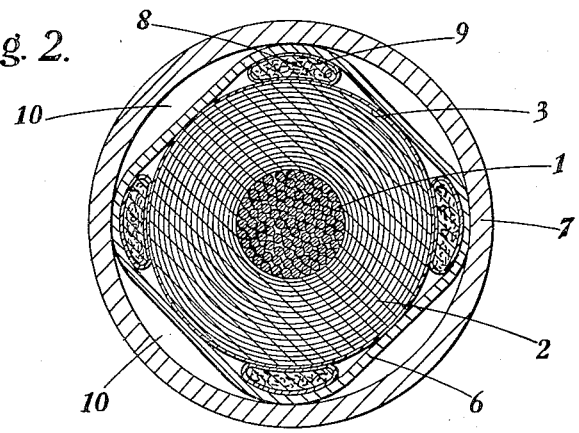
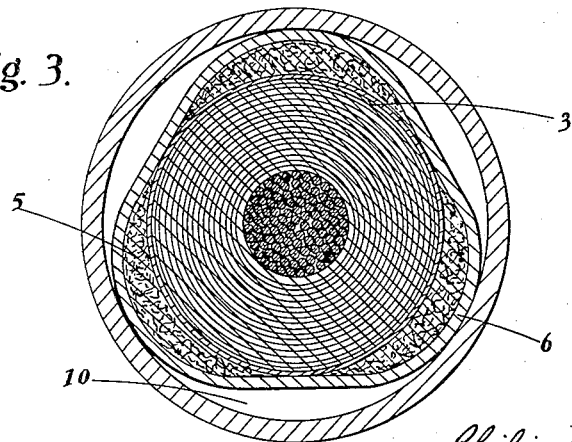

1,972,625

UNITED STATES PATENT OFFICE 1,972,625

ELECTRIC CABLE

Philip Vassar Hunter, London, England, assignor to Callender's Cable and Construction Company, Limited, London, England, a British company Application August 3, 1932, Serial No. 627,342
In Great Britain August 12, 1931

4 Claims. (Cl. 173—266)

This invention relates to electric cables, primarily for high tension, of the kind insulated by permeable impregnated material, for instance paper. The invention provides improved means for dealing with the difficulties which arise owing to the change of volume of the impregnating liquid, or semi-liquid, such as oil or compound, which takes place as the temperature of the cable varies.

In constructing cables, either single or multicore, it is the general practice to arrange the core or cores and insulation so that they give a circular form to the cable body, and permit a cylindrical sheath to be applied to it. Multicore cables are, however, known in which the fillings between the cores are so shaped that they do not produce in conjunction with the cores, a circular form of cable body. For instance, a three-core cable may have the form in section of a triangle with rounded corners; the sheath applied to such a cable has the same form as the cable body. Further, in British patent No. 370,149 we have described a single core cable having a non-circular body enclosed within a correspondingly shaped sheath.

In accordance with the present invention we take a cable body of non-circular cross-section and apply to it a sheath of lead or lead alloy which is also of non-circular cross-section and which fits on to the cable body. To this sheath we apply a second sheath of lead or lead alloy which is of circular cross-section, the whole forming a unitary structure. The spaces which are formed between the two sheaths serve as longitudinal passages for pressure fluid and when the cable is in service, they are connected with external reservoirs, so that the pressure fluid can flow in and out as the volume of the spaces between the sheaths changes, or the volume of the fluid decreases and increases. Since the inner sheath is non-circular in cross-section, it has a greater tendency to deform under pressure than the outer sheath, so that while the latter is of sufficient strength to protect the cable from external damage, the inner sheath can change its shape comparatively readily under the action of relatively small pressure differences to accommodate variations in volume of the cable body. The inner sheath is returned to its original position upon contraction of the cable body by the pressure of the fluid acting upon the exterior surface of the inner sheath. As previously pointed out the cable body with its two sheaths constitutes a unitary structure so that it can be handled, transported and laid with the same degree of freedom as a cable of ordinary construction.

The two cable sheaths generally will be so proportioned that they are in contact at those places where the longest radial dimensions of the inner sheath exist, for instance at the rounded corners of the triangle in the case of a cable body of this shape. In any case, however, longitudinal passages for the pressure fluid will be provided.

Some forms of construction in accordance with the invention are illustrated as examples in the accompanying drawing in which:—

Figure 1 shows an end section of a three-core cable,

Figure 2, a corresponding view of a single core cable, and

Figure 3, a similar view of another form of single core cable.

In Figure 1 each core consists of the stranded conductors 1 and impregnated paper insulation 2. Each core has an outer conductive layer 3 which may consist of a metal tape or may be of metallized paper, the three layers being in contact with each other. The three cores are held together by a metal tape 4 and between the cores are interposed fillings 5 made of paper or other suitable material. The whole forms a body of substantially triangular shape and this is enclosed within a correspondingly shaped lead sheath 6, the cores fitting into the rounded corners of the sheath. The inner sheath 6 and its contents are enclosed within an outer lead sheath 7, the dimensions of the outer sheath being such that the rounded portions of the inner sheath are in contact with the inner surface of the outer sheath. In this example the non-circular cable body is formed by the three insulated conductors with their conductive layers, the fillers and the metal binding tape.

In Figure 2 the core consists of the conductors 1 and paper insulation 2 as before, the insulation 2 having an outer conductive layer 3. A convenient number of members 8 are applied helically to the outside of the core over the conductive layer 3. Each of the members 8 may consist of a number of paper cords enclosed within a conductive layer 9, the layers 3 and 9 being in contact with each other. In Figure 2 there are shown four of these paper cord members 8. The core and the members 8 are enclosed within an inner lead sheath 6 which, in the construction illustrated, has four straight sides of equal length, the corners, however, being rounded off. These rounded portions are in contact with the inner surface of an outer lead sheath 7. In this case the cable body is formed by the insulated conductor with its conductive layer, and the four paper cord members with their conductive layers.

In Figure 3 the core with its conductive layer 3 is enclosed in an inner lead sheath which is of substantially triangular shape in cross-section but having rounded corners, the straight portions of the sides of the triangle being in contact with the conductive layer 3. The spaces between the core and the rounded portions of the lead sheath may be filled up with fillings 5 of paper or other suitable material. In this example the cable body is formed by the insulated conductor with its conductive layer and the three fillers.

In each of the constructions illustrated the flat sides of the inner lead sheath have a greater tendency to deform under pressure than the outer sheath of circular cross-section. This tendency may be increased by making the inner sheath of less thickness than the outer sheath as shown in the drawing.

The non-circular shape of the inner sheath provides spaces 10 between the two sheaths. These spaces form longitudinal passages for pressure fluid and when the cables are in service these will be connected with external reservoirs, so that the pressure fluid which may, for example, be a suitable oil, can flow in and out as the volume of the spaces changes, or the volume of the fluid decreases and increases.

In the constructions shown in Figure 2 the members 8 and their conductive layers, and in Figure 3 the fillings 5, may be replaced by ribs or enlargements projecting inwardly from the inner lead sheath and formed integral therewith.

It will be seen that with such a cable the volume of the space within the inner sheath, may vary to accommodate variations in the volume of the impregnating material, while being maintained under sufficient external pressure to prevent the formation of spaces free of the impregnating material as the latter contracts.

The term "sheath" used above is intended to have its ordinary meaning attached to it as used in connection with the manufacture of electric cables, that is to say, it is intended to refer to a tube made of soft metal, such as lead or lead alloy which is used to enclose the core or cores of an electric cable. In the manufacture of the cable constructed in accordance with this invention the inner sheath will be extruded over the cable body and the outer sheath will be extruded over the inner sheath.

What I claim as my invention and desire to secure by Letters Patent is:—

1. An electric cable having a cable body of non-circular cross-section, an extruded inner metal sheath made mainly of lead and of non-circular cross-section fitting on the cable body, and an extruded outer metal sheath made mainly of lead and of circular cross-section enclosing the inner metal sheath, the whole forming a unitary structure, and the spaces formed between the two sheaths providing for the enclosure of pressure fluid.

2. An electric cable having a cable body of non-circular cross-section, an extruded inner metal sheath made mainly of lead and of non-circular cross-section fitting on the cable body, and having straight walls joined by rounded portions, and an extruded outer metal sheath made mainly of lead and of circular cross-section enclosing the inner metal sheath, the whole forming a unitary structure, and the spaces formed between the two sheaths providing for the enclosure of pressure fluid.

3. An electric cable having a cable body of non-circular cross-section, an extruded inner metal sheath made mainly of lead and of non-circular cross-section fitting on the cable body, and an extruded outer metal sheath made mainly of lead and of circular cross-section and having a wall of greater thickness than that of the inner sheath, the whole forming a unitary structure, and the spaces formed between the two sheaths providing for the enclosure of pressure fluid.

4. An electric cable comprising a conductor, insulation around the conductor, a conductive layer around said insulation, an extruded lead sheath of non-circular cross-section around said conductive layer and contacting said conductive layer only at spaced apart points, and an outer extruded metal sheath of circular cross-section enclosing the non-circular sheath and contacting it at spaced apart points, the spaces between the two sheaths providing for the enclosure of pressure fluid.

PHILIP VASSAR HUNTER.